March 31, 1970     C. W. BRANDON     3,503,446
METHOD AND APPARATUS FOR FORMING AND/OR AUGMENTING
AN ENERGY WAVE Original Filed Dec. 6, 1965     2 Sheets-Sheet 1

INVENTOR.
CLARENCE W. BRANDON

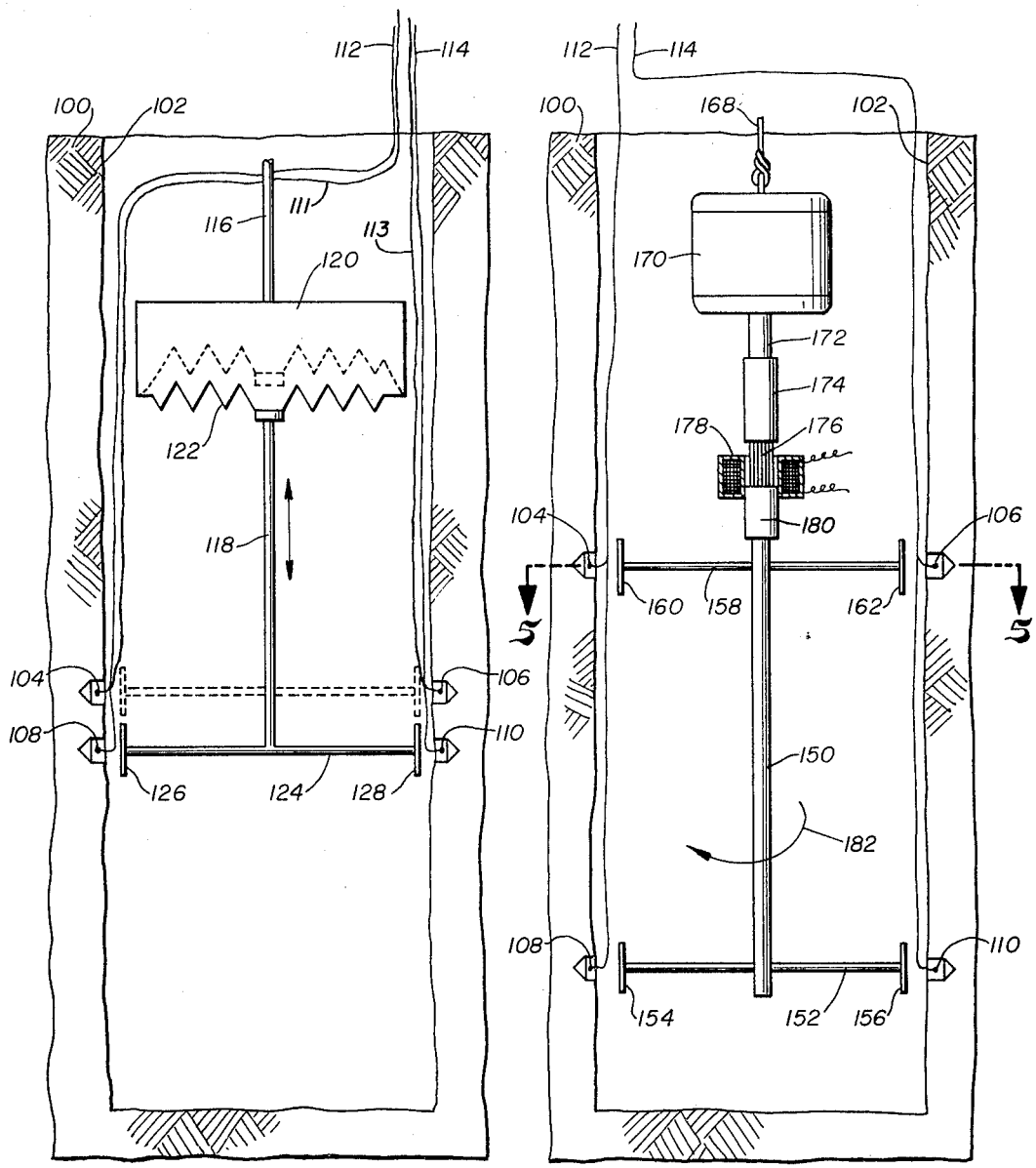

United States Patent Office 3,503,446
Patented Mar. 31, 1970

3,503,446
METHOD AND APPARATUS FOR FORMING AND/OR AUGMENTING AN ENERGY WAVE
Clarence W. Brandon, Tallahassee, Fla., assignor of twelve and one-half percent to Orpha B. Brandon, Tulsa, Okla., fifty percent to Nat A. Hardin, Catherine H. Newton, and Hazel H. Wright, jointly, all of Forsyth, Ga., and five percent to Harvey B. Jacob, Washington, D.C.
Continuation of application Ser. No. 511,957, Dec. 6, 1965. This application May 13, 1968, Ser. No. 728,852
Int. Cl. E21b 43/26
U.S. Cl. 166—249
52 Claims

ABSTRACT OF THE DISCLOSURE

A method in which an energy wave at a controlled frequency is superimposed on another energy wave transmitted through some medium to increase the energy level and heat the medium through which the energy waves are propagated. One of the energy waves is generated from an electrical current source connected to electrodes in contact with the wave transmitting medium.

---

This application is a continuation of my prior copending application, Ser. No. 511,957, filed Dec. 6, 1965, now abandoned the latter application being a continuation-in-part application of Ser. No. 389,233, now abandoned, filed July 6, 1964, which is a divisional application of S.N. 833,122, now Patent 3,141,099, which was a continuation of Ser. No. 431,388, filed May 21, 1954, now abandoned, which is a continuation-in-part of Ser. No. 241,647, filed Aug. 13, 1951, now Patent 2,796,129, dated June 18, 1957, and Ser. No. 296,038, filed June 27, 1952, now Patent 2,866,509, dated Dec. 30, 1958. The subject matter of this application also relates to the subject matter of my copending applications Ser. No. 431,246, now Patent 3,133,591, dated May 19, 1964, and Ser. No. 434,299, now Patent 3,042,115, dated July 3, 1962.

This invention relates to methods and apparatuses for forming and/or augmenting an energy wave and more specifically has reference to processes and means whereby electrical energy may be converted in an improved and advantageous manner into heat energy and may be then directly introduced into a fluid medium or into a pulsating energy wave in a fluid medium, or may be abstracted from such energy wave whereby to vary the characteristics of the wave and facilitate the treating of formations and especially oil bearing formations thereby.

It is axiomatic, as stated by generally recognized authorities in the study of the wave transmission of energy in a wave propagating medium, that heat applied to an energy carrying wave medium during the compression phase of an energy carrying wave therein, or abstracted during the rarefaction phase of such wave, will increase the energy content of the wave by that amount; while the application of heat during the rarefaction phase or its subtraction during the compression phase will decrease the wave energy content to that extent; and, also, if heat be applied to the medium at the proper phase angle before and/or after the peak of the compression and/or rarefaction phases of the wave, the frequency of the energy carrying wave may be altered correspondingly. The present invention is concerned with and based upon this fundamental principle of wave mechanics and utilizes electrical energy in different manners for these purposes.

In its various aspects, therefore, the basic and fundamental purpose of this invention is to provide means and methods whereby electrical energy may be controllably converted into heat which, in turn, may be directly introduced into an energy carrying wave in order to augment or modify the total energy content of the energy wave or to otherwise modify or control its characteristics and, alternatively, to abstract heat or mechanical energy from an energy carrying wave.

A corollary object is to apply the foregoing object and principle to the recovery of gases and oils from petroliferous formations.

Another important object employing the principles of this invention is to controllably vary the characteristics of an energy wave whereby to fracture and/or disintegrate a permeable formation.

A further important object of this invention is to provide processes and means whereby an energy carrying wave in a wave propagating medium may be initiated solely by the conversion of electrical energy to heat and the application of the latter to the medium.

An additional important specific object of the invention is to provide processes and means whereby the dielectric properties of a formation may be utilized for converting electrical energy into heat energy and for directly applying the latter to a formation or introducing the latter as energy into an energy carrying wave for treating the formation.

An additional object of this invention is to provide apparatus and processes whereby the electrical energy may be continuously applied or may instead be intermittently applied at controllable intervals to a formation for the generation of heat therein or for controlling the energy content of an energy carrying wave applied by a fluid pressure medium to the formation.

A still further important object of the invention is to provide apparatuses and processes in accordance with the preceding objects in which the variations in pressure of a fluid drive medium may be utilized to control the generation and the character of electrical impulses and their resultant conversion into heat.

A still further object of this invention is to provide apparatuses and methods as set forth in the preceding objects in which the characteristics of an energy carrying wave produced by a wave generator in a wave propagating medium may be controlled by the adjustably timed application of electrically generated heat impulses into the medium at predetermined phased relationships with respect to the energy wave produced therein.

These and other objects and advantages will become subsequently apparent as more fully hereinafter described and claimed, reference being had to the accompanying drawings forming a part hereof, wherein like numerals refer to like parts throughout, and in which:

FIGURE 1 is a somewhat diagrammatic detail view in vertical section through a portion of an oil bearing or other formation and showing a novel manner for applying a heat introducing means thereto, the heating means being adapted to apply dielectric heating or arc heating in a continuous or intermittent manner to the formation and being readily inserted into or withdrawn from the formation through a well bore therein.

FIGURE 2 is a view similar to FIGURE 1 but showing a modified construction wherein the dielectric or arc heating effect is varied by and/or in accordance with variations in pulsations applied to the fluid of a liquid drive for pressurizing an oil bearing formation to effect an application of heat in an intermittent or pulsating manner.

FIGURE 3 is a diagrammatic view in vertical section of a portion of an oil bearing formation showing a still further modified form of apparatus for introducing sensible heat into the formation and wherein a continuing intermittent application of heat impulses is effected by vertical oscillation of an impulse control timer and which may be varied as to intensity by intermittent greater pulsations of a fluid pressure medium applied to the oscillating timer and thence to the formation and which, by variation of the means pressure of the medium, will operate alternative electrodes to produce energy waves of different characteristics.

FIGURE 4 is a view of a modified construction similar to that of FIGURE 3 but wherein an electric motor or other power means is provided for rotating the heat impulse timing mechanism and wherein a solenoid is provided for intermittently varying the characteristics of the heat impulses.

EMBODIMENT OF FIGURE 1

Figure 1:
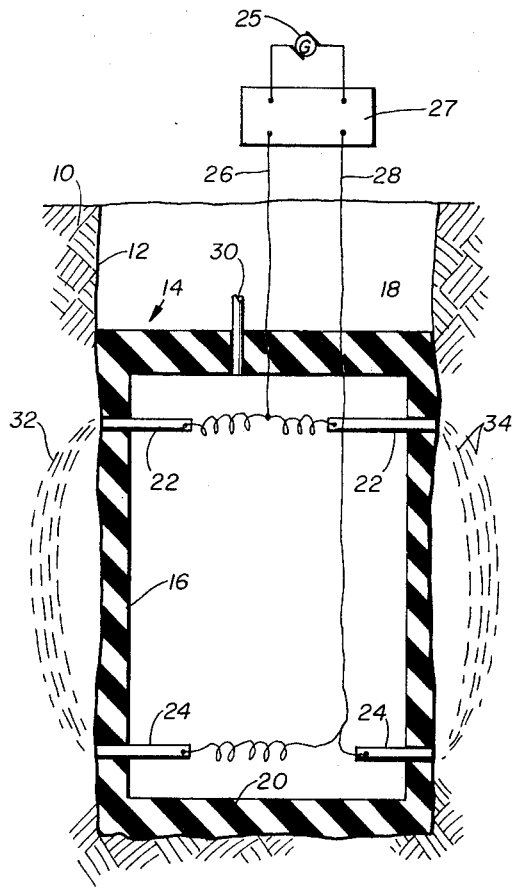
Figure 2:
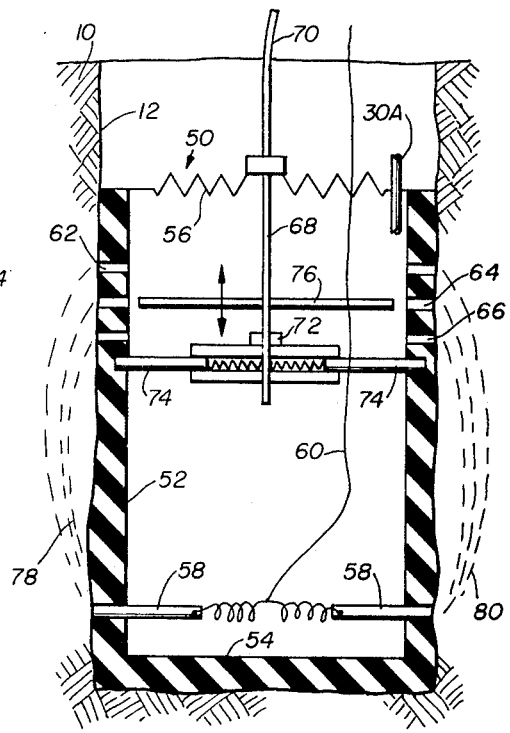

FIGURES 1 and 2 disclose embodiments in accordance with this invention wherein there is provided a compact and portable device which may be very easily introduced into or removed from a well bore in a geological formation as, for example, an oil bearing or gas bearing formation. Referring first to FIGURE 1, it will be seen that the geological formation indicated generally by the numeral 10 is provided with a well bore 12 therein which thus gives access to the interior of the formation constituting an unconfined energy transmitting medium to be treated in accordance with this invention.

In this form of the invention, the heat exchanger indicated generally by the numeral 14 is formed of a tough, deformable and yieldably expansible material of any desired character. The heat exchanger may conveniently comprise a body 16 whose interior is closed as by top and bottom walls 18 and 20, respectively. Carried by the body 16 are upper and lower electrodes 22 and 24 having their terminal portions exposed through the sides of the body. Any desired number of these electrodes may be provided as deemed to be expedient. Alternatively, the electrodes could consist of arcuate rings embedded in the exterior portion of the cylindrical body and having portions of their outer faces flush with the exterior of the body. In any event, it is the purpose of this form of the invention to provide a plurality, two or more, of spaced electrodes carried by the body which itself is of an insulating or dielectric material. Suitable electrical conductors 26 and 28 are connected with the electrodes 22, 24, extending through a suitable protective sheath or housing, not shown, are in communication with a source of electric current.

In this form of the invention it is contemplated that the heater 14 may be lowered by a cable or in any other desired manner to an appropriate position in the well bore 12 and adjacent that portion of a formation which is to be treated in accordance with this invention. At that point the expansible cylindrical body 16 is diametrically or laterally extended or enlarged into intimate tight fitting contact with the wall of the bore 12. Any suitable means may be provided for effecting this distention of the body as, for example, by applying an increased internal pressure using a non-conductive fluid to the interior of the body as through a conduit 30 which may be provided, or by increasing the pressure upon the exterior of the body by increasing the pressure to which the fluid in the bore is subjected to thus flatten and diametrically distend the body into the desired tight fitting engagement with the wall of the bore.

In any event, the body may be readily inserted into or removed from a well bore when the body is in its normal collapsed or non-distended position and when inserted and properly placed may be readily expanded into a tight fitting engagement with the wall of the bore for anchoring the body in place. When so positioned, the body is in direct heat exchange relation with the geological formation 10. With the body in place, as shown in FIGURE 1, electric current from any suitable source 25 is supplied to the conductors 26 and 28 and thence to the electrodes 22 and 24. The electric current flows along uncontrolled paths between the ends of the electrodes through the adjacent portion of the formation as indicated by the lines of flow 32 and 34. It will, of course, be apparent that, depending upon the position of the electrodes and the number of the same, the lines or paths of flow of the current will vary and the intensity of the heating effect may be controlled or adjusted.

The current flowing between the electrodes may be from a source 25 such as to provide dielectric heating or resistance heating of the formation by the passage of the current therethrough or to effect heating by establishing an arc between the electrodes and the like. As in the embodiments described hereinafter, the current may be supplied to the electrodes and, consequently, the heat emitted from the same may be given a pulsating effect by properly timing the electrical impulses introduced to the electrodes such as by using a switching means 27 to the conductors 26 and 28. With such an arrangement the device may be employed solely for the purpose of heating a formation. However, and more important, this apparatus constitutes a means for initiating an energy carrying wave which will tend to vibrate and/or otherwise treat the formation, or may be used to apply heat energy into or remove the same from an energy carrying wave introduced into the formation from other sources, in the manner to be now set forth.

Assume that a fluid pressure medium such as oil or water is being supplied under pressure to the well bore 12 for pressurizing or water driving the formation to aid in secondary oil recovery, this being a well known practice in the art. This fluid, as above mentioned, has distended the body 16 to secure the same at the desired location in the well bore and formation and also to establish a good heat exchange relation therewith. This drive fluid may have an energy carrying wave produced therein whereby to produce pulsating pressures which are applied to the formation. The production of these energy waves and their modes of application to the formation may be any of the types disclosed, set forth, and claimed in my prior applications Ser. No. 241,647, now Patent 2,796,129, and Ser. No. 296,038, now Patent 2,866,509, of which Ser. No. 665,995, filed June 17, 1957, is a continuation-in-part; Ser. No. 431,246, now Patent 3,133,591, of which Ser. No. 376,285, filed Apr. 28, 1964, now Patent No. 3,247,-901, and Ser. No. 501,906, filed Oct. 22, 1965, now Patent No. 3,339,635, are divisions thereof; Ser. No. 434,299, now Patent 3,042,115, of which Ser. No. 206,207, filed June 29, 1962, is a division thereof.

However, when electric energy is periodically or intermittently applied to the device 14 herein, it is preferred to apply the electric energy at the same or at a multiple of the frequency of the pulsations of the drive fluid or at the phase angle thereof and to so time the electrical impulses relative to the fluid pressure pulsations that the electrical impulses and, therefore, the resultant heat impulses will be applied to the fluid medium at the same phase angle of the energy wave in the medium.

It is now well known that when heat is applied to a medium during the compression phase of an energy wave therein the energy of the heat is added to and increases that of the energy wave while its application upon the rarefaction phase of the energy wave results in a corresponding decrease in the wave energy. Thus, this embodiment of the invention may be utilized to add energy to or subtract it from an energy wave which is treating a formation.

In some instances, the apparatus may be used to initiate and maintain an energy wave in the fluid drive medium. When heat is periodically generated and applied to the fluid, the adjacent layers of molecules of the fluid are expanded by the heat impulses and move away from the heater. Between successive heat impulses, cooler molecules move between the heated and expanded molecules and the heater body 16. In this manner, there is produced a continuing series or layers of heated, expanded molecules separated by cooler, contracted molecules. These layers constitute compression and rarefaction phases of an energy wave, just as though they were produced by reciprocation of a piston or the vibrating of a wire in the medium.

This embodiment of the invention, therefore, presents a means which is compact and portable, easily applied to, removed from or adjustably positioned in a formation and which facilitates the conversion of electrical energy into heat and/or wave energy and its application to a fluid drive medium and to a formation for treating the latter.

EMBODIMENT OF FIGURE 2

The principles of the invention as disclosed in connection with FIGURE 1 are also applicable to the embodiment of FIGURE 2. As in the preceding embodiment, the heat exchanger 50 is illustrated as positioned in the wall bore 12 of the formation 10 and distended into secure seating and sealing engagement therein as in the preceding embodiment. The exchanger 50 is also of a dielectric, yieldably expansible material, including a cylindrical body or body portion 52 together with a bottom wall 54. In place of the previously described top wall, the body is closed by a diaphragm or other flexible top wall 56. The exchanger 50 is distended similarly to the device in FIGURE 1 using conduit 30A or as otherwise described.

An electrode 58 similar to the electrode 24 of FIGURE 1 is applied near the lower portion of the wall 52 of the heater body and is connected with an electric conductor 60 for supplying current to the same. However, in lieu of a single pair of electrodes 22 of FIGURE 1, there is provided a plurality of sets of oppositely disposed electrodes 62, 64 and 66 having their terminal portions exposed through the sides of the body. It will be understood that any desired number of these electrodes may be provided, three having been illustrated for the sake of simplicity in setting forth the principles of this form of the invention. Secured to the central portion of the diaphragm 56 is a supporting rod 68 to which is connected an electric conductor 70. The lower end of the rod 68 is journaled in a suitable guide bearing 72 carried by expansible supporting rods 74 upon the interior of the heater body. Intermediate its ends the rod 68 is provided with a transverse bar 76 constituting a reciprocable switch blade.

The arrangement is such that when the bar or switch blade 76 is in registration with one of the sets of oppositely disposed aligned contacts 62, 64 or 66, an electrical circuit will be established between the conductor 70, the rod 68, the blade 76, the selected contact, with the electrode 58 and the conductor 60. When the contact is so established, lines of flow for the current extend through the formation between the upper selected and activated electrodes 62, 64 or 66 and the lower electrode 58, as shown in the flow lines 78 and 80. These flow lines are identical in the functioning of each as regards the flow lines 32, 34 of the embodiment previously described. However, in this form of the invention, there is a further different joint action of the electrodes and their resulting flow lines. By varying the pressure to which the diaphragm 56 is subjected, the position of the switch bar 76 can be vertically adjusted to cause the same to selectively register with the pairs of electrodes 62, 64 or 66. Thus, the length of the flow lines 78 and 80 can be adjusted, thereby varying the intensity of the resultant heating action.

Still further, however, it is possible to maintain a selected means pressure upon the fluid to cause the blade 76 to operatively register with a selected set of electrodes 62, 64 or 66 and then to impart a slight pulsation, relative to the selected mean pressure, to the fluid in contact with the diaphragm and thus cause a slight pulsing of the latter. This slight pulsation will be sufficient to displace the switch blade 76 by or through a slight vertical movement. This movement may be such as will be sufficient to intermittently make and break the circuit with respect to the adjacent selected upper pair of electrodes, but will be insufficient to cause the blade 76 to move into operative contact with any but the selected set of electrodes. Thus, an intermittent application of electric current between the electrodes is possible, thereby producing a pulsating emission of heat from the device into the formation for the various purposes and functions set forth in connection with the preceding and previously described embodiments.

Still further, however, it is possible by increasing the amplitude of vertical vibration of the diaphragm 56 to cause the switch blade 76 to establish contact intermittently with more than one seleced pair of electrodes. Thus, if the blade is moved sufficiently, it will intermittently establish a circuit with the pair of electrodes 62 and the pair of electrodes 64, or between the pair of electrodes 64 and the pair of electrodes 66, it being evident that a pulsating application of heat is thereby possible, and that this application is of varying intensity since it will pass through flow paths of different lengths. Still further, the switch blade 76 may be so moved as to contact all of the electrodes in succession, thus producing to the maximum the sequential varying of the flow paths.

In the two forms disclosed in FIGURES 1 and 2, it will therefore be apparent that considerable variation in the characteristics of the heat input into a formation may be effected, and that variations in the pressure of the fluid to which the formation is subjected are utilized to control the variations and fluctuations in the heat input.

It is, of course, intended that, as in the embodiment of FIGURE 1, the heat energy imparted into the fluid medium by this embodiment may be used to initiate an energy transmitting wave in a propagating medium, or may function to modify or maintain an energy wave produced by other sources.

Thus, fracturing, acidizing, disintegrating, secondary recovery and/or other desirable results of treating a formation may be effected in a permeable formation by this arrangement for controllably altering the characteristics of or initiating an energy wave.

EMBODIMENT OF FIGURE 3

Figure 5:
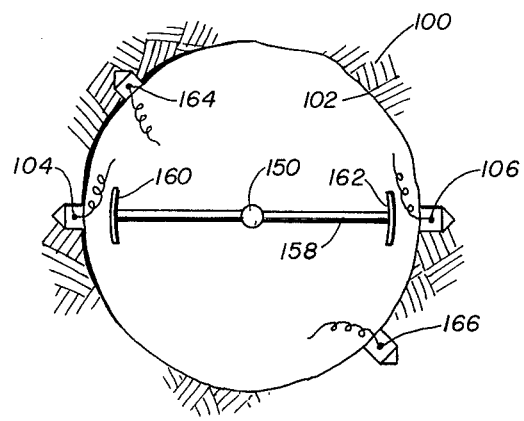
FIGURE 5 is a horizontal sectional detail view taken substantially upon the plane indicated by the section line 5—5 of FIGURE 4 and indicating a manner in which the phase angle of the heat impulses are correlated to provide an augmented energy transmitting wave which may be initiated and/or maintained by the heat-introducing device.

FIGURES 3, 4 and 5 disclose embodiments somewhat similar in principle to those of FIGURES 1 and 2. Thus, in each of FIGURES 3, 4 and 5 there is disclosed a geological formation 100 which may comprise an oil bearing formation having a well bore 102 therein. Secured in any desired manner in the sides of the well bore are two or more vertically spaced sets of aligned and oppositely disposed electrodes 104 and 106 for the upper set and 108 and 110 for the lower set. For example, the electrodes are driven into the formation by mechanical wedges, explosive driving means such as used in driving studs in concrete, or hydraulic actuated mechanisms. Two pairs of insulated electric conductors 111, 112 and 113, 114 supplies current to these electrodes.

In the arrangement of FIGURE 3, the upper set of electrodes 104, 106 are relatively closely positioned with respect to the lower set 108, 110. The conductor 111 supplies current to the electrode 104, the conductor 112 supplies current to the electrode 108, conductor 113 supplies current to the electrode 106 while the other conductor 114 supplies current to the electrode 110. Suitably vertically supported as by a wire line or tubing means within the well bore and centralized by well known means, not shown, adjacent the electrodes and mounted for vertical reciprocation with respect thereto is an upper rod 116 which is aligned with a lower rod 118, the two rods being connected to opposite sides of a vertically reciprocable expansible chamber 120 having a movable diaphragm 122 forming one wall of the same. At its lower end the rod 118 is provided with a transversely disposed switch bar or blade 124 which upon its opposite extremities is provided with vertically elongated switch members 126 and 128.

The arrangement is such that as the assembly consisting of the rods 116 and 118, the expansible chamber 120 and the switch bar 124 is reciprocated vertically, as shown by the arrows, the switch contact members 126, 128 are moved vertically from the full lines to the dotted lines. This vertical reciprocation causes an arc to pass from the contact members 126, 128 to the adjacent electrodes 108, 110 or 104, 106, or produces a dielectric or resistance heating effect. Thus, an electric heating arc is produced which serves to emit heat from the device into the adjacent formation. As in the preceding embodiments, the pulsations of the heat emission may be so timed as to produce an energy bearing wave or apply energy into an energy bearing wave or to abstract energy therefrom.

In this form of the invention it is further contemplated that variations in the pressure of the fluid medium within the well bore, applied to the sensitive expansion chamber device 120, will cause the diaphragm 122 thereof to flex between its full and dotted line positions. These pulsations will thus also effect a vertical displacement of the switch bar 124. By means of the expansible chamber device, the bar may be positioned adjacent the lower electrodes, as shown in full lines in FIGURE 3, or alternatively may be positioned adjacent the upper electrodes as shown in dotted lines therein. Thus, the pressure pulsations may be relied upon as a means for positioning the switch bar to selectively activate different sets of electrodes.

Still further, the pressure variations may be such as to strike out or break the arc between the contacts 126, 128 and 104, 106 and/or 108, 110.

It is, of course, apparent that the pulsations applied by the member 120 may be combined with the vertical reciprocation of the members 116, 118 to thus more widely vary the types of heating effects and pulsations produced.

It is further contemplated that the electrodes 108 and 110 may be supplied with a different intensity of current from the elecrodes 104 and 106 whereby when the contact members 126 and 128 are shifted vertically by the action of fluid pulsations upon the actuator 120, the different electric circuits will produce heating effects of greatly different intensities and heat content. These heat inputs can be timed to the energy wave in the fluid medium to selectively weaken or strengthen the energy thereof or to initiate and maintain an energy bearing wave.

Further, by giving the bar 124 a sufficiently great vertical movement, the contacts 126 and 128 will be caused to operatively engage both sets of electrodes thereby applying additional electrical and heat energy to the wave energy.

Thus, fracturing, acidizing, secondary recovery, disintegrating and/or other desirable results of treating a formation may be effected in a permeable formation by this arrangement for controllably altering the characteristics of or initiating an energy wave.

Still further, the apparatus of FIGURE 3, as is also the case with the other modifications disclosed herein, may be used solely to initiate and/or maintain or modify an energy wave, while the conduit 116 may be operatively connected to a pilot source of hydraulic and/or electrical power in order to so control the paths of current travel at the electrodes that the characterisics and frequencies of energy waves may be variably controlled.

EMBODIMENTS OF FIGURES 4 AND 5

The embodiment of FIGURES 4 and 5 differs from that of FIGURE 3 in that the conductors 112, 114 are respectively connected to the electrodes 104, 108 and 106, 110, and these latter sets of electrodes are more widely vertically spaced. Also, a different type and actuation of the switch member is provided. In this embodiment, the latter consists of a bar 150, similar to the bar 118, having a transverse switch bar 152 carried thereby which, at its outer ends, has the switch contact plates 154 and 156. These plates register with the electrodes 108 and 110. Near the upper end of the rod 150 there is also provided a second transverse switch bar 158 having at its outer end the switch contact plates 160, 162 respectively registering with the electrodes 104, 106.

As shown in FIGURE 5, there is provided for each of the upper and lower sets of electrodes previously mentioned corresponding angularly or circumferentially spaced second sets of electrodes, the upper pair of these being shown at 164 and 166, while the lower set, being similar, has not been illustrated. The electrodes are driven into the formation as previously described. The second set of upper and lower electrodes is placed at any desired angular relation with repect to the first set of the upper and lower electrodes for sequential actuation by the members 154, 156 and 160, 162 in a manner and for a purpose which will be subsequently set forth.

Supported by a cable 168 or any other suitable support means in the well bore is an electric motor 170 or other suitable source of power having a driving shaft 172. This shaft terminates in or carries mounted thereon a collar of sleeve 174 terminating in a diametrically reduced stem-like extension splined at 176 and carried by surrounding the same is a hollow solenoid or electromagnet 178 which may be supplied by current from any suitable source. The splined extremity 176 slidably receives thereon an internally splined cylinder 180 fixedly secured to the upper end of the rod 150 and supporting the latter, this cylinder being slidable within the solenoid and constituting an armature for the same.

Motor 170 and related connected rod 150, and solenoid 178 are supported and centralized in the well by well known means, not shown.

When the solenoid 178 is energized, the plunger 180 is drawn upwardly into the same thereby lifting the rod 150 and the switch bars 152, 158 carried thereby. When the solenoid is de-energized, these members are correspondingly lowered under the influence of gravity and/or by spring or any other suitable means, if desired.

By means of the electric motor 170, rotation, as indicated by the arrow 182, is imparted to the rod 150 and to the switch bars. During this rotation, the upper switch blade members 160, 162 and the lower set 154, 156 first register with the upper pair of electrodes 104, 106 and the lower pair 108, 110 to establish an arc of an electric or dielectric circuit for heating purposes. Upon further rotation through a predetermined angular interval, the switch contact members, as seen in FIGURE 5, register with the second sets of contacts 164 and 166 of the upper and lower sets to produce a second flow of current. It is contemplated that the angular interval between the electrodes 104, 164 and 106, 166 shall be such as to cause a predetermined timing between the two flows of current. This timing is such that a predetermined relation will be imparted to the two waves initiated by the fluid current at the two sets of contacts. For example, a 45° angular displacement will serve to augment the energy content of the wave produced by the pulsating heat emissions of the device, as set forth in detail in my heretofore mentioned copending applications.

It will be seen that during this continuous rotation of the switch bars 152 and 158, there may also be applied either at irregular intervals or periodically a vertical reciprocation of the same through the solenoid. This movement will tend to draw out or prolong and/or cut off the flow of current through the electrodes and the adjacent switch blade contact members.

The form of the invention of FIGURES 4 and 5 therefor provides still further means and processes for initiating or for varying the type and characteristics of the pulsating heat impulses introduced into a formation or the fluid mediums contacting the same, or varying the characteristics of an energy wave in a wave conducting medium.

Thus, fracturing, acidizing, disintegrating, secondary recovery and/or desirable results of treating a formation may be effected in a permeable formation by this arrangement for controllably altering the characteristics of or initiating an energy wave.

What is claimed as new is as follows:

1. An apparatus for electrically heating an oil bearing formation comprising a laterally expansible dielectric body adapted to be placed in a well bore and laterally expanded into a tight sealing engagement with the formation, electrodes carried by said body and engaging the formation, means for supplying electrical energy to said electrodes and producing a flow of electric current in said formation between said electrodes whereby to produce heat in said formation.

2. An apparatus in accordance with claim 1 including means to intermittently apply electrical energy to said electrodes to produce a pulsating heating of the formation.

3. The combination of claim 1 wherein the electrodes are disposed in vertically spaced relation in said bore and on said body.

4. An apparatus for applying heat to a selected portion of an oil bearing formation comprising a hollow flexible dielectric body adapted to be inserted into a well bore and fixedly secured therein in tight engagement with a selected portion of a formation by lateral expansion of the flexible body through the application of pressure thereto from a fluid pressure medium, electrical heating means carried by said body and positioned for good heat contact with the formation when the body is laterally distended into engagement with the formation.

5. The combination of claim 4 wherein said body is cylindrical with top and bottom closure walls, said body being adapted to expand laterally when fluid pressure is applied to said top wall, said electrical heating means being carried by the cylindrical wall of said body and positioned to establish vertically extending zones of heat.

6. The combination of claim 4 wherein said electrical heating means includes spaced electrodes carried by said body, electric conductors attached to said electrodes.

7. The combination of claim 4 wherein said electrical heating means comprises a plurality of spaced electrodes, means for supplying electric current selectively to pairs of electrodes to thereby establish different lengths of heat flow in the formation.

8. An apparatus for electrically heating an oil bearing formation comprising means for placing a first electrode in contact with a formation to be heated and a pair of spaced second and third electrodes in contact with a different portion of the formation to be heated, means for supplying electric current selectively to said electrodes whereby to establish electric flow in the formation of different lengths and different heating effects between the first electrode and the second and the third electrodes.

9. The combination of claim 8 including means responsive to predetermined changes in a fluid pressure medium applied to the formation for actuating said current supply means.

10. The process of heating a subsurface oil bearing formation which comprises placing a laterally expansible dielectric body in a well bore at a selected position in a formation, laterally expanding the body into tight fitting engagement with the formation, causing by the expansion of said body the positioning of spaced electrodes into good electrical contact with spaced portions of the formation, applying electrical energy to said electrodes to thereby establish a flow of electric current between said electrodes and through said formation for electrically heating the latter.

11. The process of claim 10 wherein the lateral expansion of the body is effected by a fluid pressure medium in the well bore.

12. The process of claim 10 wherein the electrical energy is intermittently applied to the electrodes to thereby produce a pulsating flow of current and heating effect in the formation.

13. The process of claim 10 wherein the electrical energy is intermittently applied to the electrodes to thereby produce a pulsating flow of current and heating effect in the formation and wherein the electric flow is effected intermittently along paths of different length in the formation.

14. The process of claim 10 wherein the electrical energy is intermittently applied to the electrodes to thereby produce a pulsating flow of current and heating effect in the formation and wherein the electric flow is effected intermittently along paths of the same length.

15. The process of claim 10 wherein the electrical energy is intermittently applied to the electrodes to thereby produce a pulsating flow of current and heating effect in the formation and wherein the electric flow is effected intermittently along paths of different lengths in the formation and wherein the flow of current along paths of different lengths is effected by pressure pulsations in the fluid pressure medium in the well bore.

16. The process of heating a subsurface oil bearing formation which comprises applying a first electrode in good electrical contact with a formation, placing second and third electrodes in good electrical contact with the formation and at different distances from the first electrode, applying electrical energy to said first electrode and selectively and intermittently to said second and third electrodes thereby producing intermittent current flows of different lengths in the formation and thereby applying unequal heating impulses to said formation.

17. The process of claim 16 including causing shifting of the flow of current between said electrodes by pulsations in the pressure of a fluid medium in the well bore.

18. The process of electrically producing pulsating heating impulses of a relatively low frequency in a heat transmitting medium from a source of electric current which is pulsing at a relatively higher frequency comprising positioning a pair of electrodes in heat transmitting relation to said heat transmitting medium; applying a source of electric current having a relatively high frequency but relatively low intensity of pulsation to said electrodes to produce thereby an electric arc and resulting heat, both of which are pulsing at a relatively high frequency and with a relatively low intensity; intermittently varying the flow of the electric current to thereby produce a relatively low frequency but high intensity pulsations in the electric current, producing thereby an arc and heating effect between said electrodes of a relatively low frequency but relatively high intensity of pulsation.

19. The process of claim 18 wherein said medium is a treating fluid containing an acidizing agent for acidizing a permeable formation.

20. The process of claim 19 wherein the intensity of the pulsation applied to said treating fluid is amplified sufficiently to fracture or disintegrate said formation.

21. The process of claim 18 wherein said medium is a drive fluid for producing fluids from a permeable formation.

22. The process of claim 21 wherein oil or gas is the produced fluid from said permeable formation.

23. The process of claim 21 wherein said drive fluid contains an acidizing agent that increases production of fluid from said formation.

24. The process of claim 18 wherein the pulsation is continuous.

25. The process of claim 18 wherein said medium is a liquid.

26. The process of claim 18 wherein the medium is the fluids of an oil and gas bearing formation.

27. The process of claim 26 wherein the intensity of the pulsation is amplified sufficiently to rupture said formation, whereby fracturing of the formation is achieved and oil production is increased.

28. The process of claim 26 wherein the intensity of the pulsation is amplified, the step of continuing the pulsations until rupture of the formation is achieved, thus fracturing the formation and increasing oil production therefrom.

29. The process of generating pulsations in a heat transmitting fluid medium in energy wave applying relationship to an earth formation from a source of electrical current through electrodes comprising the steps of: positioning the electrodes in heat transfer relation to said fluid medium; conducting current from said source to the electrodes; periodically varying the intensity of said current to produce pulses of heat energy in said fluid medium; and transmitting said heat energy pulses through said fluid medium causing increases in molecular movement within said fluid medium to establish a continuous energy wave to said formation.

30. The process of claim 29 wherein the medium is a liquid.

31. The process of claim 30 wherein the intensity of the pulsation applied to said liquid medium is amplified sufficiently to fracture or disintegrate said formation.

32. The process of claim 29 wherein said medium is the fluids of an oil and gas bearing formation.

33. The process of claim 32 wherein the intensity of the electric current is amplified sufficiently to rupture said formation, whereby fracturing of the formation is achieved and oil production is increased.

34. The process of claim 29 wherein said fluid medium is a treating fluid containing an acidizing agent for acidizing said formation.

35. The process of claim 34 wherein the intensity of the pulsation applied to said treating fluid is amplified sufficiently to fracture or disintegrate said formation.

36. The process of claim 29 wherein said medium is a drive fluid for producing fluids from said formation.

37. The process of claim 36 wherein oil or gas is the produced fluid from said formation.

38. The process of claim 36 wherein said drive fluid contains an acidizing agent that increases permeability of said formation.

39. A method of establishing pulsating energy in an unconfined energy transmitting medium comprising the steps of: generating a first energy wave of predetermined frequency externally of said medium; transmitting said first energy wave to the medium for propagation therethrough; generating a second energy wave of controlled frequency; superimposing the second energy wave on the first energy wave in an energy level increasing phase relationship; one of said energy waves being electrically generated and converted into heat energy while being conducted along uncontrolled paths through the energy transmitting medium to augment the energy level of the other energy wave.

40. A method of establishing pulsating energy in an energy transmitting medium comprising the steps of: generating a first energy wave of predetermined frequency; transmitting said first energy wave to the medium for propagation therethrough; generating a second energy wave of controlled frequency; superimposing the second energy wave on the first energy wave in an energy level increasing phase relationship; one of said energy waves being electrically generated and converted into heat energy while being conducted through the energy transmitting medium to augment the energy level of the other energy wave, said first energy wave being transmitted by a fluid to the energy transmitting medium at said predetermined frequency; said second energy wave being electrically generated and conducted by electrodes to the medium to heat the medium only during compression phases of the first energy wave.

41. The method of claim 40 wherein said energy transmitting medium is an oil bearing formation.

42. A process for creating the compressions and rarefactions of a periodic energy wave within an energy or heat transmitting liquid medium in energy wave relationship to an earth formation by electrical current, comprising positioning spaced electrodes attached to a source of electrical current in heat transmitting relation to said liquid medium; discharging electrical current from said source in a continuing intermittent application to said electrodes positioned to said liquid medium to produce successive flows of electrical current through said liquid medium; producing series of compressional heated and expanded impulses of molecular activity alternated with contracted rarefactions of cooler molecular movement within said liquid medium by continuing intermittent discharging of said electrical current through said liquid medium from said electrodes to initiate and maintain an energy wave in said liquid medium and thus apply said energy wave to said formation.

43. The process of claim 42 wherein said liquid medium is water.

44. The process of claim 42 wherein the liquid medium is water in energy wave applying relationship to a formation.

45. The process of claim 42 wherein said formation is a permeable formation and said liquid medium is a treating fluid upon which said energy wave is intensified sufficiently to fracture or disintegrate said formation.

46. The process of claim 42 wherein said liquid medium is the fluids of an oil and gas bearing formation.

47. The process of claim 46 wherein the intensity of the energy wave is amplified sufficiently to rupture said formation, whereby fracturing of the formation is achieved and oil and gas production is increased.

48. The process of claim 42 wherein said liquid medium is a treating fluid containing an acidizing agent for acidizing said formation.

49. The process of claim 48 wherein the intensity of the energy wave applied to said treating fluid is amplified sufficiently to fracture or disintegrate said formation.

50. The process of claim 42 wherein said liquid medium is a means for driving fluids through a permeable formation.

51. The process of claim 50 wherein said driven fluids are oil or gas contained in said formation.

52. The process of claim 50 wherein said liquid medium contains an acidizing agent to assist in the driving of said fluids through said formation.

References Cited

UNITED STATES PATENTS

| | | | |
|---|---|---|---|
| 709,868 | 9/1902 | Bradley et al. | 204—326 |
| 1,222,761 | 4/1917 | Herrold | 313—232 X |
| 1,372,743 | 3/1921 | Gardner | 166—60 X |
| 1,457,479 | 6/1923 | Wolcott | 166—60 X |
| 1,744,173 | 1/1930 | Longhi | 204—171 |
| 1,993,642 | 3/1935 | Aarts et al. | 175—16 |
| 2,437,456 | 3/1948 | Bodine | 166—43 |
| 2,559,227 | 7/1951 | Rieber | 313—232 X |
| 2,669,689 | 2/1954 | Doll | 324—10 X |
| 2,732,525 | 1/1956 | Blanchard et al. | 324—10 |
| 2,795,279 | 6/1957 | Sarapuu | 166—57 X |
| 3,116,449 | 12/1963 | Vogel | 166—177 X |
| 3,180,418 | 4/1965 | MacLeod | 166—177 X |
| 1,142,496 | 6/1915 | Cohen | 313—232 X |
| 1,222,761 | 4/1917 | Herrold. | |

(Other references on following page)

References Cited

| | | |
|---|---|---|
| 1,372,743 | 3/1921 | Gardner. |
| 2,549,464 | 4/1951 | Hartley ------------ 290—1 |
| 2,559,227 | 7/1951 | Rieber. |
| 2,795,279 | 6/1957 | Sarapuu. |
| 2,836,033 | 5/1958 | Morrison ------------ 60—24 |
| 2,866,509 | 12/1958 | Branson ------------ 166—177 |
| 3,180,418 | 4/1965 | MacLeod. |

DAVID H. BROWN, Primary Examiner

U.S. Cl. X.R.

166—177, 308

UNITED STATES PATENT OFFICE
CERTIFICATE OF CORRECTION

Patent No. 3,503,446      Dated March 31, 1970

Inventor(s)   Clarence W. Brandon

It is certified that error appears in the above-identified patent and that said Letters Patent are hereby corrected as shown below:

Column 1, line 8, after "Harvey B." replace "Jacob" with --Jacobson--.

Signed and sealed this 13th day of February 1973.

(SEAL)
Attest:

EDWARD M. FLETCHER, JR.
Attesting Officer

ROBERT GOTTSCHALK
Commissioner of Patents